(12) United States Patent
Chan et al.

(10) Patent No.: US 9,178,610 B1
(45) Date of Patent: Nov. 3, 2015

(54) OPTICAL LOOPBACK IN A WAVELENGTH DIVISION MULTIPLEXING SYSTEM

(71) Applicant: Google Inc., Mountain View, CA (US)

(72) Inventors: Yut Loy Chan, San Jose, CA (US); Pedram Zare Dashti, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 13/828,500

(22) Filed: Mar. 14, 2013

(51) Int. Cl.
*H04B 10/00* (2013.01)
*H04B 10/07* (2013.01)

(52) U.S. Cl.
CPC ........................................ *H04B 10/07* (2013.01)

(58) Field of Classification Search
CPC .................................................... H04B 10/035
USPC .............................................................. 398/137
See application file for complete search history.

(56) References Cited

U.S. PATENT DOCUMENTS

| | | | |
|---|---|---|---|
| 5,907,417 A | 5/1999 | Darcie et al. | |
| 6,304,350 B1 | 10/2001 | Doerr et al. | |
| 6,493,335 B1 | 12/2002 | Darcie et al. | |
| 7,254,340 B2 | 8/2007 | Jung et al. | |
| 7,254,344 B2 | 8/2007 | Kim et al. | |
| 7,330,438 B2 | 2/2008 | Kim et al. | |
| 7,599,624 B2 | 10/2009 | Park et al. | |
| 7,787,771 B2 | 8/2010 | Kim et al. | |
| 8,396,362 B2 * | 3/2013 | Nagaki et al. | 398/25 |
| 8,483,565 B2 * | 7/2013 | Elbers et al. | 398/79 |
| 8,929,748 B2 * | 1/2015 | Hu et al. | 398/196 |
| 2003/0156840 A1 * | 8/2003 | Uchikata | 398/7 |
| 2004/0223687 A1 * | 11/2004 | Kim et al. | 385/24 |
| 2005/0084267 A1 | 4/2005 | Fan et al. | |
| 2006/0093359 A1 | 5/2006 | Lee et al. | |
| 2006/0093360 A1 | 5/2006 | Kim et al. | |
| 2006/0115271 A1 | 6/2006 | Hwang et al. | |
| 2008/0131125 A1 | 6/2008 | Byoung Whi et al. | |
| 2009/0324249 A1 * | 12/2009 | Zhang | 398/177 |

FOREIGN PATENT DOCUMENTS

| | | |
|---|---|---|
| EP | 786878 A2 | 7/1997 |
| EP | 1612974 A1 | 1/2006 |

\* cited by examiner

*Primary Examiner* — Danny Leung
(74) *Attorney, Agent, or Firm* — Honigman Miller Schwartz and Cohn LLP

(57) ABSTRACT

An optical communication device includes a transmitter having a transmitter port and a receiver having loopback and receiver ports. The transmitter transmits a first multiplexed signal in a first optical spectrum from the transmitter port. The receiver receives the first multiplexed signal in the loopback port and a second multiplexed signal in the receiver port. The second multiplexed signal is in a second optical spectrum different from the first optical spectrum. The receiver includes a demultiplexer in optical communication with the loopback port and the receiver port. The demultiplexer demultiplexes the first and second multiplexed signals received by the loopback and receiver ports.

24 Claims, 8 Drawing Sheets

OPTICAL LOOPBACK IN A WAVELENGTH DIVISION MULTIPLEXING SYSTEM

TECHNICAL FIELD

This disclosure relates to optical loopback in a wavelength division multiplexing system.

BACKGROUND

Fiber optic communication allows transmission of information from a source to a destination using optical fibers, which are flexible, transparent fibers made of thin glass silica or plastic that transmits light throughout the length of the fiber between the source and the destination. Fiber optic communications allows for the transmission of data over longer distances and at higher bandwidth than other known forms of communications.

Optical networks generally use multiplexing to exploit the large bandwidth of optics. Multiplexing enables several virtual channels to be formed on a single fiber. Therefore, multiplexing several optic signals increases the connectivity of a network. There are two methods of multiplexing signals, time division multiplexing and wavelength division multiplexing. Time division multiplexing (TDM) multiplexes several signals by establishing different virtual channels using different time slots. Wavelength division multiplexing (WDM) multiplexes the signals by having different virtual channels use different wavelengths.

Bi-directional passive optical network (PON) systems may use two different spectrums during optical communication. One spectrum is used for sending information and the other is used for receiving information, resulting in bi-directional communication through one fiber. Long haul and metro WDM systems generally use a pair of fibers for transmission in two directions, so there is no need to use two different bands and a simple loopback is possible. WDM systems may include a multiplexer and a demultiplexer. The multiplexer combines the signals at a transmission side, and the demultiplexer separates the signals at a receiver side. Some systems include a multiplexer that combines signals and separates the signals.

Optical loopback is difficult for a wavelength division multiplexing (WDM) optical communication system using two separate spectrums/bands for optical communication. Optical loopback is generally accomplished by looping back the transmit signal to the receive port using a fiber patch cord and/or an attenuator. For a WDM system having a transmit spectrum A different from a receive spectrum 1B, simply using a fiber patch cord and/or an attenuator to loopback an optical signal is generally not possible, since a receiving filter typically blocks all the transmit wavelengths. Instead, the WDM system typically converts the optical transmit signals to electrical signals and then converts the electrical signals back to optical signals having the correct receiving wavelengths. This solution, however, requires a large number of optical transceivers with different wavelengths. Alternatively, a WDM transceiver module with reversed wavelength assignment can be installed into the same system to perform a loopback test. That solution is relatively expensive as well and adds uncertainty from the test module themselves.

SUMMARY

One aspect of the disclosure provides an optical communication device that includes a transmitter having a transmitter port and a receiver having loopback and receiver ports. The transmitter transmits a first multiplexed signal in a first optical spectrum from the transmitter port. The receiver receives the first multiplexed signal in the loopback port and a second multiplexed signal in the receiver port. The second multiplexed signal is in a second optical spectrum different from the first optical spectrum. The receiver includes a demultiplexer in optical communication with the loopback port and the receiver port. The demultiplexer demultiplexes the first and second multiplexed signals received by the loopback and receiver ports.

Implementations of the disclosure may include one or more of the following features. In some implementations, the optical communication device includes an optical coupler in optical communication with both the transmitter port and the loopback port. The optical coupler may route the first multiplexed signal to the loopback port. In some examples, the optical coupler routes a threshold percentage of power (e.g. between 1% and 20%) of the first multiplexed signal to the loopback port. In some examples, the optical communication device includes an optical switch in optical communication with the optical coupler and the loopback port. The optical switch controls routing of the first multiplexed signal to the loopback port. Additionally, the optical communication device may include a controller connected to and controlling the optical switch. The controller allows the demultiplexer to receive the first multiplexed signal while the demultiplexer fails to receive the second multiplexed signal. In some examples, the optical communication device includes a combiner in optical communication with the optical coupler and the loopback port.

In some implementations, the optical communication device further includes an optical switch in optical communication with the transmitter port and the loopback port. The optical switch routes the first multiplexed signal to the loopback port. The device may include a controller connected to and controlling the optical switch. The controller allows the demultiplexer to receive the first multiplexed signal while the demultiplexer fails to receive the second multiplexed signal. In some examples, the device includes a combiner in optical communication with the optical switch and the loopback port.

In some implementations, for each multiplexed signal, the demultiplexer separates the multiplexed signal into demultiplexed signals and outputs the demultiplexed signals to respective mapped output ports. The demultiplexer may include an arrayed waveguide grating having first and second input ports and N output ports. The first input port receives the first multiplexed signal from the loopback port, and the second input port receiving the second multiplexed signal from the receiving port.

The receiver may include an array of receivers optically connected to the demultiplexer. Additionally or alternatively, the transmitter may include an array of transmitters, and a multiplexer in optical communication with the transmitters, the multiplexer receiving signals from the transmitters, multiplexing the received signals, and outputting the first multiplexed signal. The multiplexer may include an arrayed waveguide grating.

Another aspect of the disclosure provides a method of processing optical signals in a wavelength division multiplexing passive optical network. The method includes transmitting a first multiplexed signal in a first optical spectrum from a transmitter port. The method includes receiving the first multiplexed signal in a loopback port and receiving a second multiplexed signal in a receiver port. The second multiplexed signal is in a second optical spectrum different from the first optical spectrum. The method further includes demultiplexing the first and second multiplexed signals.

In some implementations, during the demultiplexing of the first and second multiplexed signals, for each multiplexed signal, the method includes separating the multiplexed signal into demultiplexed signals and outputting the demultiplexed signals to respective output ports. The demultiplexed signals of the first and second multiplexed signals may be mapped to respective output ports. Additionally or alternatively, the method may include routing the demultiplexed signals from the output ports to an array of receivers.

In some implementations, the method includes splitting the first multiplexed signal and routing the split signal to the loopback port. The split signal may have a threshold percentage of power (e.g., between 1% and 20%). In some examples, the method includes combining the split signal with a third multiplexed signal received by the loopback port. In some examples, the method includes controlling routing of the split signal to the loopback port by allowing delivery of the first multiplexed signal to the loopback port while the failing to receive the second multiplexed signal at the receiver port.

In some implementations, the method further includes receiving substantially 100% of the first multiplexed signal in a loopback port. The method may include controlling receipt of the first multiplexed signal in a loopback port by allowing delivery of the first multiplexed signal to the loopback port while the failing to receive the second multiplexed signal at the receiver port. Additionally the method may include combining the first multiplexed signal with a third multiplexed signal received by the loopback port.

In some examples, the method includes receiving signals from an array of transmitters. The method may also include multiplexing the received signals, and outputting the first multiplexed signal.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
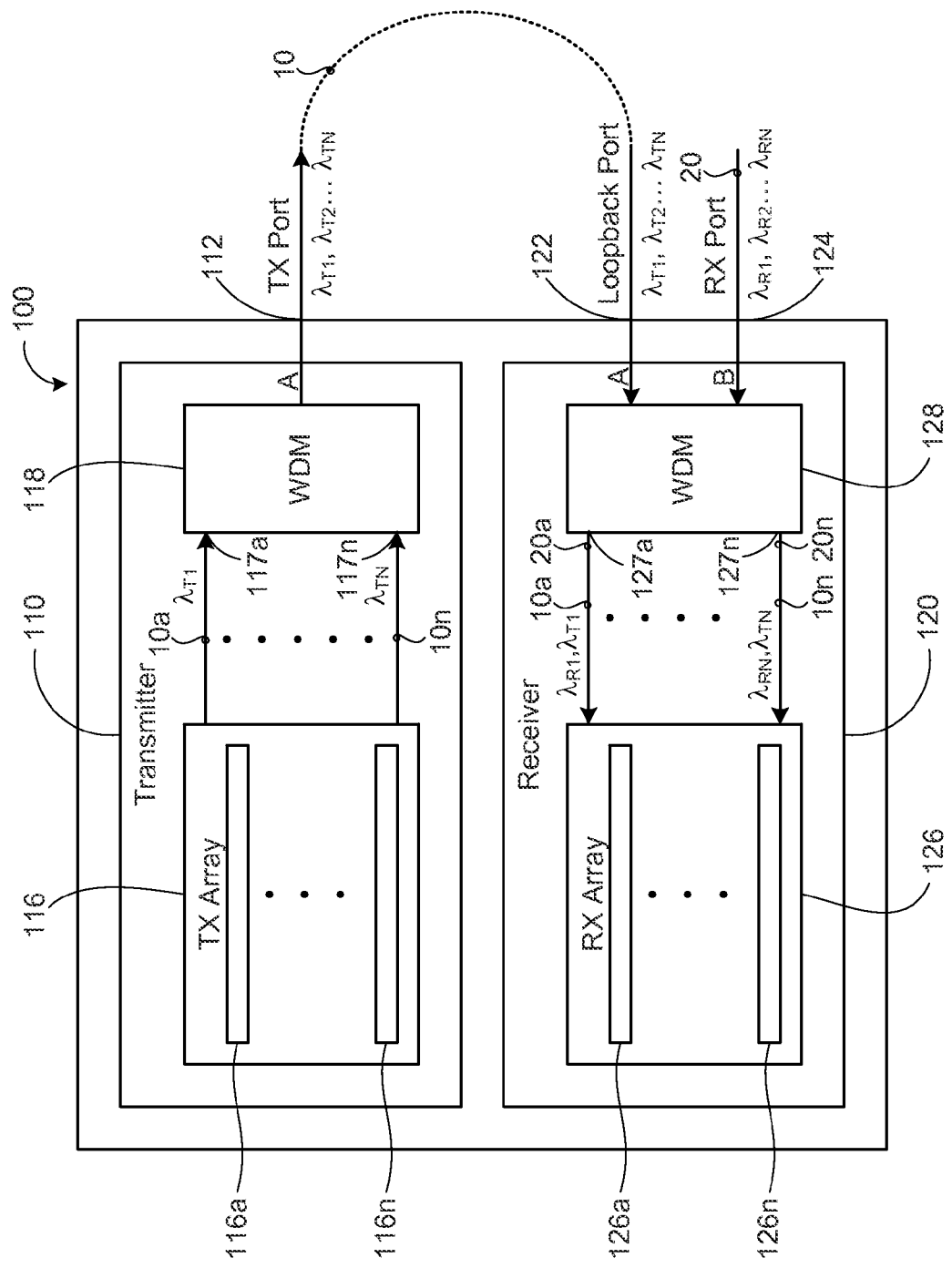
FIG. 1 is a schematic view of an exemplary optical communication device.
Figure 2:
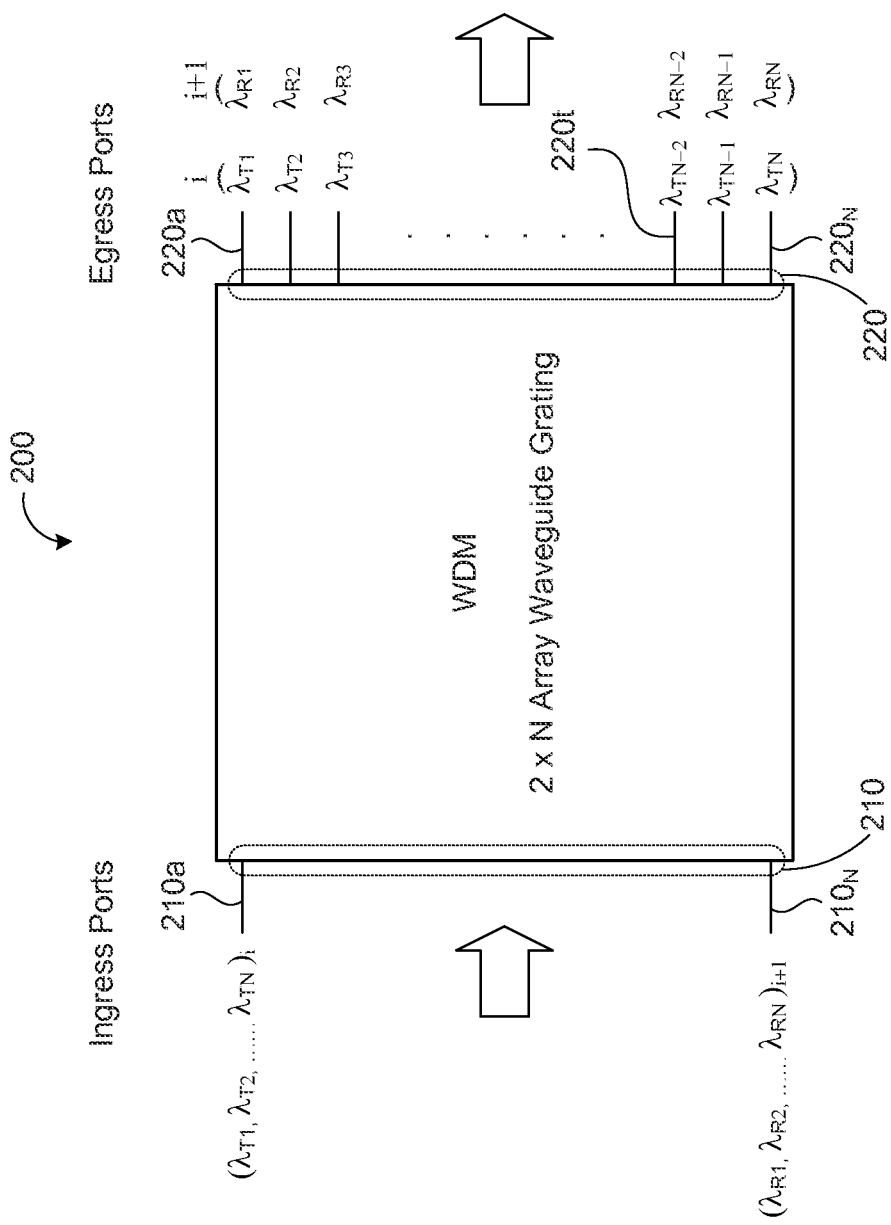
FIG. 2 is a schematic view of an arrayed waveguide grating (AWG).

Referring to FIGS. 1 and 2, in some implementations, an optical communication device 100 includes an optical transmitter 110 and an optical receiver 120. The transmitter 110 receives electrical signals and converts the electrical signals into corresponding optical signals $10a\text{-}n$ having corresponding wavelengths $\lambda_{T1\text{-}TN}$. The transmitters 110 may be semiconductor devices (e.g., light-emitting diodes (LEDs) or laser diodes). LED transmitters are relatively cheap and reliable, and they transmit incoherent light having a wide optical spectrum. Laser diode transmitters are generally more expensive than LED transmitters. Laser diode transmitters emit light at a higher power than LEDs, the light transmitted is coherent light. When the light waves emitted are at the same frequency, the beam of light is known to be a coherent light. However, when the beam of light emits light waves at different wavelengths, the emitted light is known as incoherent light. In some examples, the transmitter 110 includes a transmitter array 116 and a multiplexer 118. The transmitter array 116 includes multiple transmitters $116a\text{-}n$ that transmit optical signals $10a\text{-}n$ at corresponding wavelengths $\lambda_{T1\text{-}TN}$. The multiplexer 118 receives the light/optical signals $10a\text{-}n$ emitted from the transmitter array 116 at corresponding ports $117a\text{-}n$ and multiplexes (combines) the signals $10a\text{-}n$, resulting in a first multiplexed signal 10 outputted from the transmitter port 112 of the transmitter 110. The first multiplexed signal 10 is in a first optical spectrum A.

The receiver 120 receives an optical signal 10, 20 and converts it to an electrical signal (current/voltage). In some examples, the receiver 120 includes a receiver array 126 in optical communication with a demultiplexer 128 (e.g., a multiplexing/demultiplexing device). The receiver array 126 includes a plurality of receivers $126a\text{-}n$ for receiving different optical signals $10a\text{-}n$, $20a\text{-}n$ at corresponding wavelengths $\lambda_{T1\text{-}TN}$, $\lambda_{R1\text{-}RN}$. The demultiplexer 128 receives a second multiplexed signal 20 at a receiving port 124, demultiplexes the second multiplexed signal 20 into the multiple received signals $20a\text{-}n$ having corresponding wavelengths, and outputs the demultiplexed signals $20a\text{-}n$ at corresponding ports $127a\text{-}n$, which are in optical communication with the receivers $126a\text{-}n$.

Referring to FIG. 2, in some implementations, the multiplexer 118, 128 used in one or both of the transmitter 110 and the receiver 120 is an arrayed waveguide gratings 200 (AWG). AWG 200 is commonly used to multiplex an optical signal in a wavelength division multiplexed system. AWGs 200 can multiplex a large number of wavelengths $\lambda_N$ into one optical fiber, thus increasing the transmission capacity of optical networks. AWGs 200 can therefore multiplex channels of several wavelengths $\lambda_N$ onto a single optical fiber at a transmission end, and can also demultiplex one single channel having different wavelengths $\lambda_N$ at a receiving end of an optical communication network. An AWG 200 is a passive planar light wave circuit device typically used in optical networks as a wavelength multiplexer and/or demultiplexer. AWGs 200 also have wavelength routing capabilities. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side, which is noted as cyclic. In the examples shown herein, the multiplexer 118 and the demultiplexer 128 are each 2×N AWGs 200; however, other configurations are possible as well, such as N×N AWGs 200 in combination with other components.

Referring back to FIG. 1, in some implementations, the receiver 120 includes a loopback port 122. The receiver 120 receives the first multiplexed signal 10 in the loopback port 122 and a second multiplexed signal 20 in a receiver port 124. The first multiplexed signal 10 is in a first optical spectrum A, and the second multiplexed signal 20 is in a second optical spectrum B different from the first optical spectrum A. The receiver 120 includes a demultiplexer 128 in optical communication with the loopback port 122 and the receiver port 124. The demultiplexer 128 demultiplexes the first and second multiplexed signals 10, 20 received by the loopback and receiver ports 122, 124, respectively.

Figure 3:
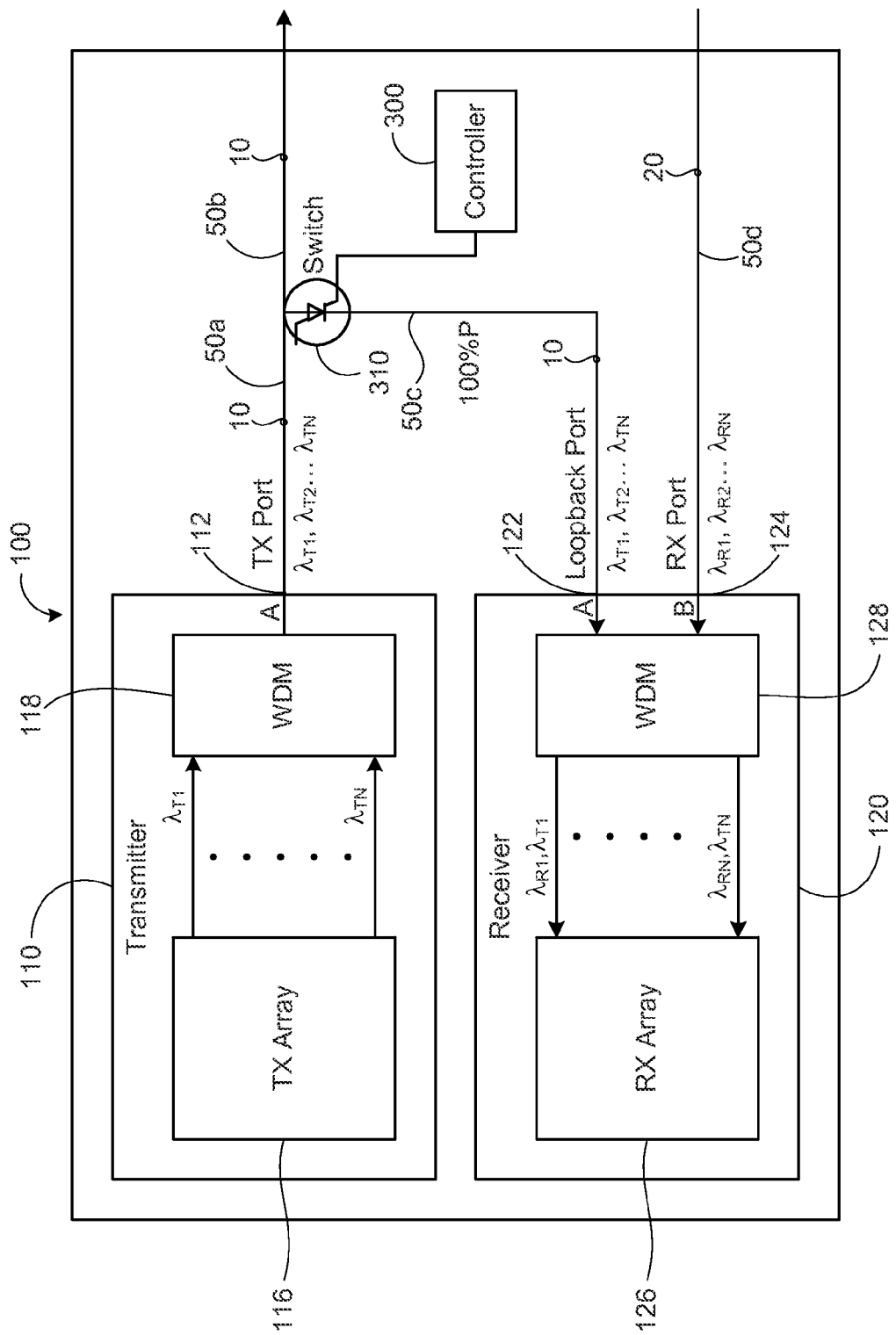
FIG. 3 is a schematic view of an exemplary optical communication device having a switch and a controller.

Referring to FIG. 3, in some implementations, the optical communication device 100 further includes an optical switch 310 in optical communication with the transmitter port 112 and the loopback port 122. The optical switch 310 routes the first multiplexed signal 10 to the loopback port 122. In the example shown, the first multiplexed signal 10 propagates along a first fiber 50a from the transmitter port 112 to the switch 310. The optical switch 310 enables a light signal 10 to be selectively switched from first optical fiber 50a to second or third optical fiber 50b, 50c. Optical switches 310 are usually of two types, on/off and routing. On/off switches make or break the optical connection between a single input and a single output, whereas routing switches connect an input to any of several outputs. As shown, the optical switch 310 routes/diverts 100% of the power of the first multiplexed signal 10 to the loopback port 122 of the receiver 120 by routing the first multiplexed signal 10 from the first optical fiber 50a to the third optical fiber 50c. Alternatively, the optical switch 310 may route 100% of the power of the first multiplexed signal 10 from the transmitter port 112 along the first optical fiber 50a to the second optical fiber 50b.

In some implementations, the optical communication device 100 includes a controller 300 connected to and controlling the optical switch 310. The controller 300 controls the switch 310 and allows the demultiplexer 128 of the receiver 120 to receive the first multiplexed signal 10 from the third optical fiber 50c while the demultiplexer 128 fails or does not receive the second multiplexed signal 20 from a fourth optical fiber 50d in communication with the receiver port 124 (e.g., to avoid interference). The controller 300 may also allow the demultiplexer 128 to receive the second multiplexed signal 20 when the switch 310 is turned off (or turned on) which means that the switch 310 is not routing/diverting the first multiplexed signal 10 to the loopback port 122 of the receiver 120.

Figure 4:
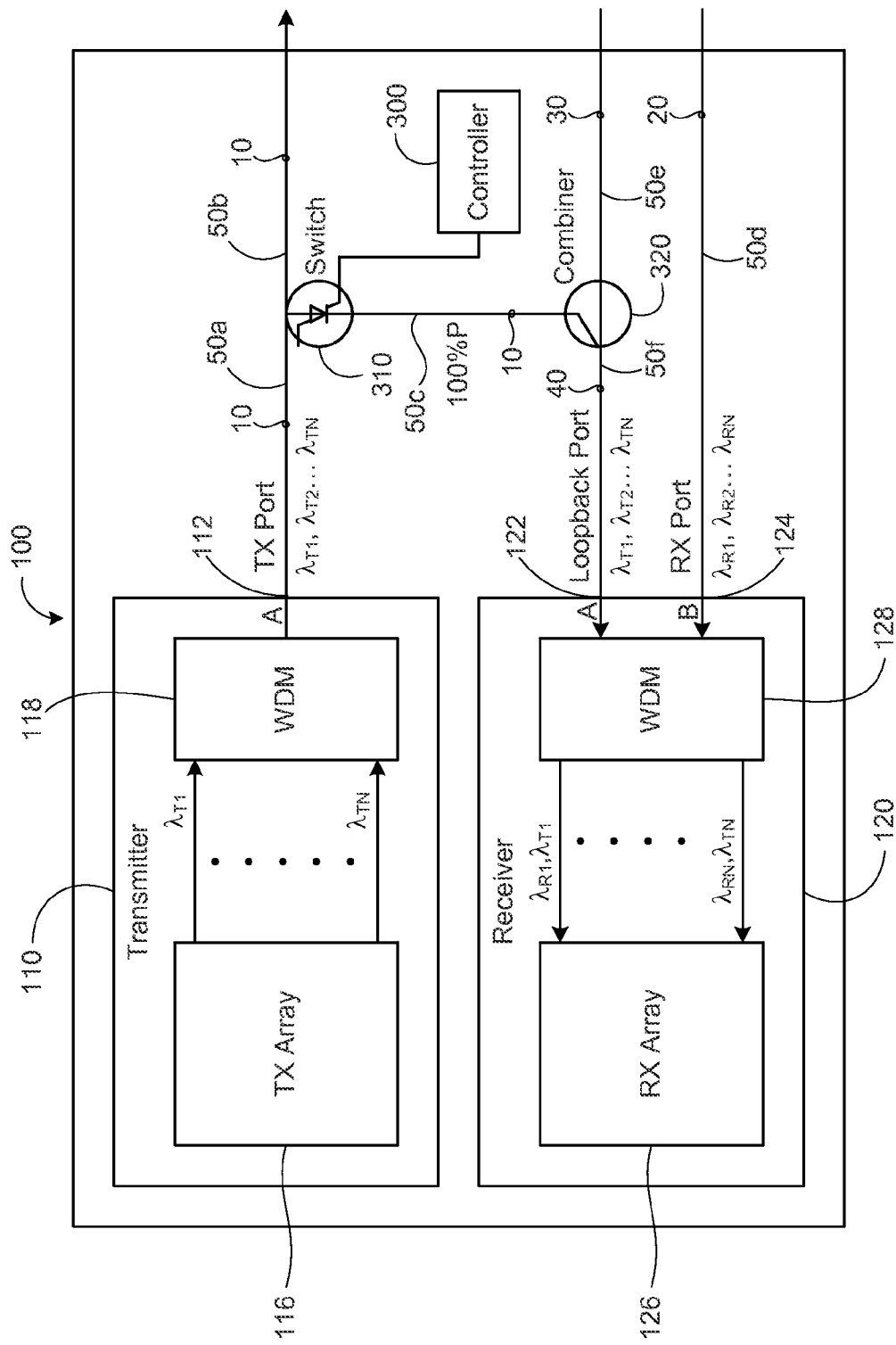
FIG. 4 is a schematic view of an exemplary optical communication device having a switch, a controller, and a combiner.
Figure 5:
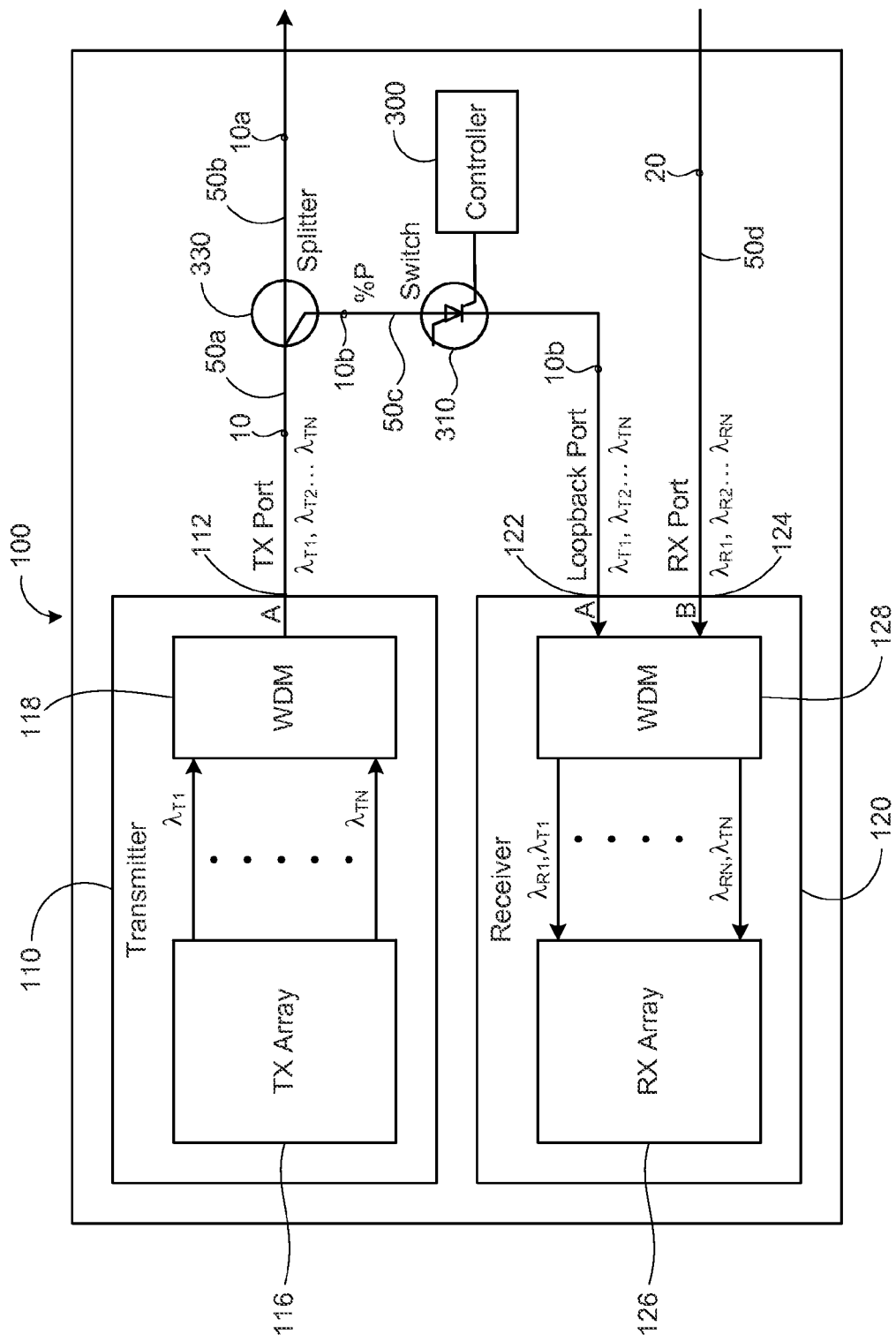
FIG. 5 is a schematic view of an exemplary optical communication device having a switch, a controller, and a splitter.
Figure 6:
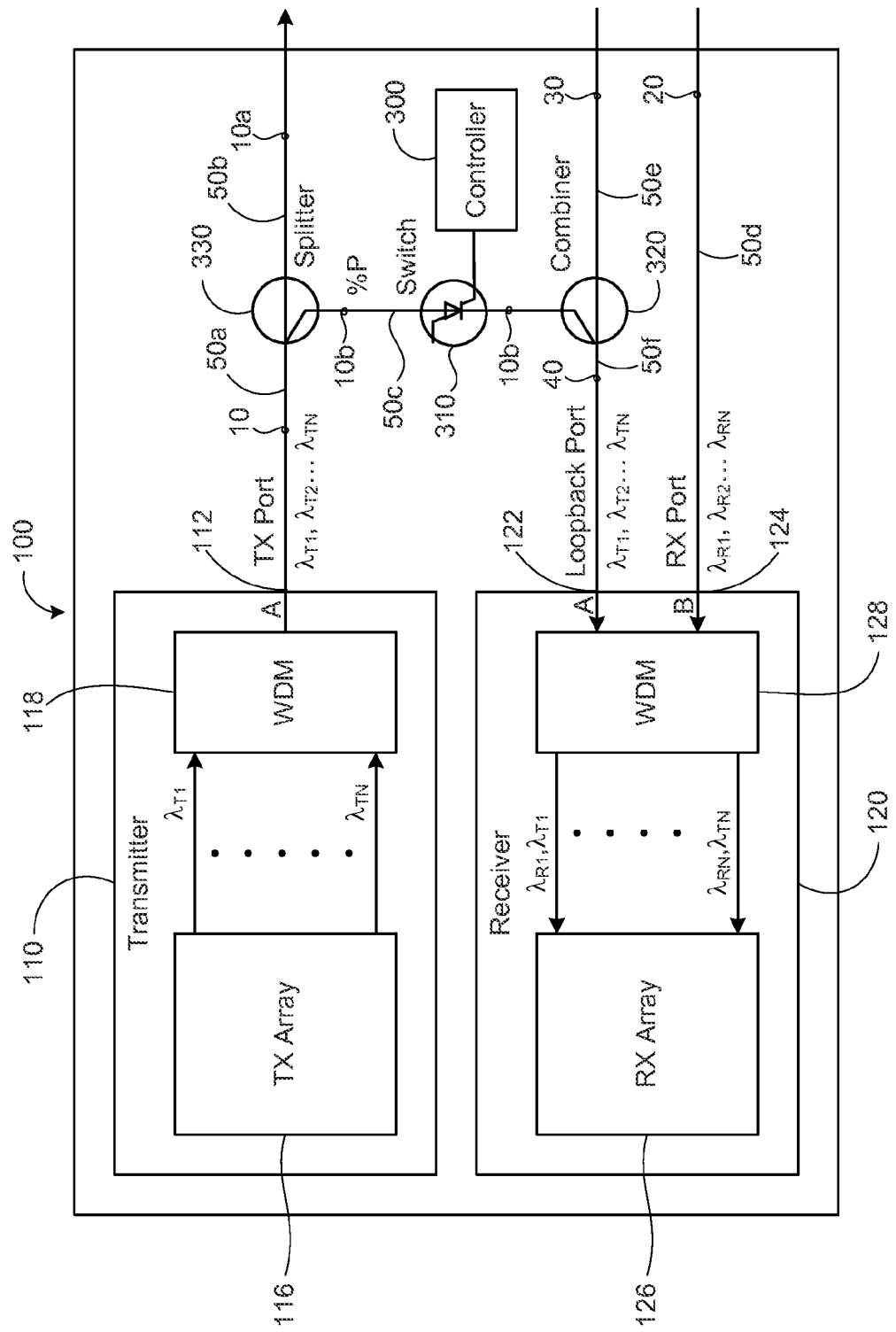
FIG. 6 is a schematic view of an exemplary optical communication device having a switch, a controller, a combiner, and a splitter.

Referring to FIGS. 4-6, the device 100 may include one or more optical couplers 320, 330. An optical coupler 320, 330 (also referred to as a fiber optic coupler) connects two or more fiber optic ends and divides one input between two or more outputs, or combines two or more inputs into one output. For example, the optical coupler may combine two or more signals and/or split a sum of signals into two or more outputs. Optical couplers 320, 330 may include single window, dual window, or wide band. Single window couplers are used for systems with a single wavelength having a narrow wavelength window. Dual wavelength couplers are used in system with two wavelengths having a wide wavelength for each window. Wide band couplers are used for a single wavelength system with a wider wavelength window. Optical couplers 320, 330 may be an active device or a passive device. A passive coupler redistributes the optical signal without converting the optical signal to an electrical signal. An active coupler is an electronic device that splits or combines the optical signal electrically by using fiber optic detectors and sources for input and output. The optical couplers 320, 330 include optical splitters 330 and optical combiners 320. The splitter 330 and the combiner 320 can be the same physical component moving the light signal in opposite directions. Therefore, the type of coupler 320, 330 may be chosen based on the system or device requirements.

Referring to FIG. 4, in some implementations, the device 100 includes an optical combiner 320 in optical communication with the optical switch 310 and the loopback port 122. The optical combiner 320 connects the third optical fiber 50c with fifth and sixth optical fibers 50e, 50f, and combines two (or more) input signals 10, 30 into one output signal 40. The optical combiner 320 combines an optical signal 30 propagated along the fifth optical fiber 50e with the first multiplexed optical signal 10 propagated along the third optical fiber 50c and outputs the combined signal 40 along the sixth optical fiber 50f. When the switch 310 is turned on to route the first multiplexed signal 10 to the combiner 320, the combiner 320 combines the multiplexed signal 10 routed from the switch 310 with the third multiplexed signal 30. However, if the switch 310 is turned off and the first multiplexed signal 10 is not being routed to the combiner 320, then the combiner 320 routes the third optical signal 30 to the loopback port 122 of the receiver 120.

Referring to FIG. 5, in some implementations, the device 100 includes an optical splitter 330 (also referred to as a beam splitter or fiber optic splitter) optically communicating with the transmitter port 112 of the transmitter 110 and the loopback port 122 of the receiver 120. The optical splitter 330 may route the first multiplexed signal 10 to the loopback port 122 by splitting the first multiplexed signal 10 (i.e., the incoming light) into multiple multiplexed signals 10a, 10b at a certain ratio or percentage. For example, a 1 by 2 split ratio splits an incoming light beam in half and outputs 50% of the incoming beam into each of two outputs. The split ratio is determined based on an optical power budget of the device 100. The optical power budget in a fiber optic network is the allocation of available optical power transmitted from a source to ensure that a specified signal strength or optical power reaches the receiver 120. The optical power budget considers factors such as power loss due to coupling, fiber attenuation, splice losses, and connector losses. Optical budget may depend on the type of transmitters (e.g. LED or laser diode) and the type of fibers used to transmit the light. In some examples, the optical splitter 330 routes a threshold percentage of power P (e.g. between 1% and 20%) of the first multiplexed signal 10 to the loopback port 122. Other split ratios may be used based on the required optical budget of the network. In the example shown, the optical splitter 330 splits the first multiplexed signal 10 propagating along the first optical fiber 50a into a first split multiplexed signal 10a along the second optical fiber 50b and a second split multiplexed signal 10b along the third optical fiber 50c.

The optical communication device 100 may include an optical switch 310 in optical communication with the optical splitter 330 and the loopback port 122 of the receiver 120. The optical switch 310 controls routing of the first multiplexed signal 10 to the loopback port 122 (e.g., to avoid interference with the second multiplexed signal 20 received by the receiver port 124). In some examples, the receiver 120 receives one signal from either the loopback port 122 or the receiver port 124; therefore, the first multiplexed signal 10 and the second multiplexed signal 20 are mutually exclusive. In such instances, the switch 310 prevents the receiver 120 from receiving two signals 10, 20 simultaneously, which may result in signal interferences. The switch 310 is turned off or routes the first multiplexed signal 10, 100b away from the loopback port 122 when the receiver is receiving the second multiplexed signal 20. The switch 310 is turned on or routes the first multiplexed signal 10, 10b to the loopback port 122 when the second multiplexed signal 20 is not being received by the receiver port 124. The switch 310 prevents interference of the two multiplexed signals 10, 20 in the receiver demultiplexer 128 (e.g., AWG). The device 100 may include a controller 300 connected to and controlling the optical switch 310 (as previously described).

Referring to FIG. 6, in some implementations, the device 100 includes a switch 310 in optical communication with a combiner 320 and a splitter 330. The splitter 330 splits the power of the first multiplexed signal 10 into first and second split multiplexed signals 10a, 10b, based on the network power budget requirements. The second split multiplexed signal 10b has a power equal to a portion of the first multiplexed signal 10. The optical splitter 330 splits the first multiplexed signal 10 propagating along the first optical fiber 50a into a first split multiplexed signal 10a along the second optical fiber 50b and a second split multiplexed signal 10b along the third optical fiber 50c. A switch disposed along the second optical fiber 50b may route the signal 10b to the combiner 320 while in its ON state or cut off the second split multiplexed signal 10b, preventing it from reaching the combiner320, while in its OFF state. If the switch 310 is on and the second split multiplexed signal 10b is routed to the combiner 320, then the combiner 320 receives the second split multiplexed signal 10b and combines it with a third multiplexed signal 30 travelling along the fifth optical fiber 50e, which is connected to the combiner 320. The combiner 320 outputs a fourth multiplexed signal 40, which is carried by the sixth optical fiber 50f to the loopback port 122. A controller 300 connected to the switch 310 determines if the switch 310 should route the second split mutiplexed signal 100b to the controller 300, by toggling the switch 310 between its ON and OFF states. The controller 300 may make such a determination if the receiving port 124 of the receiver 120 is receiving a second multiplexed signal 20. If the second multiplexed signal 20 is received, the controller may turn the switch 310 off and the second split multiplexed signal 10b is not switched/routed to the loopback port 122.

Figure 7:
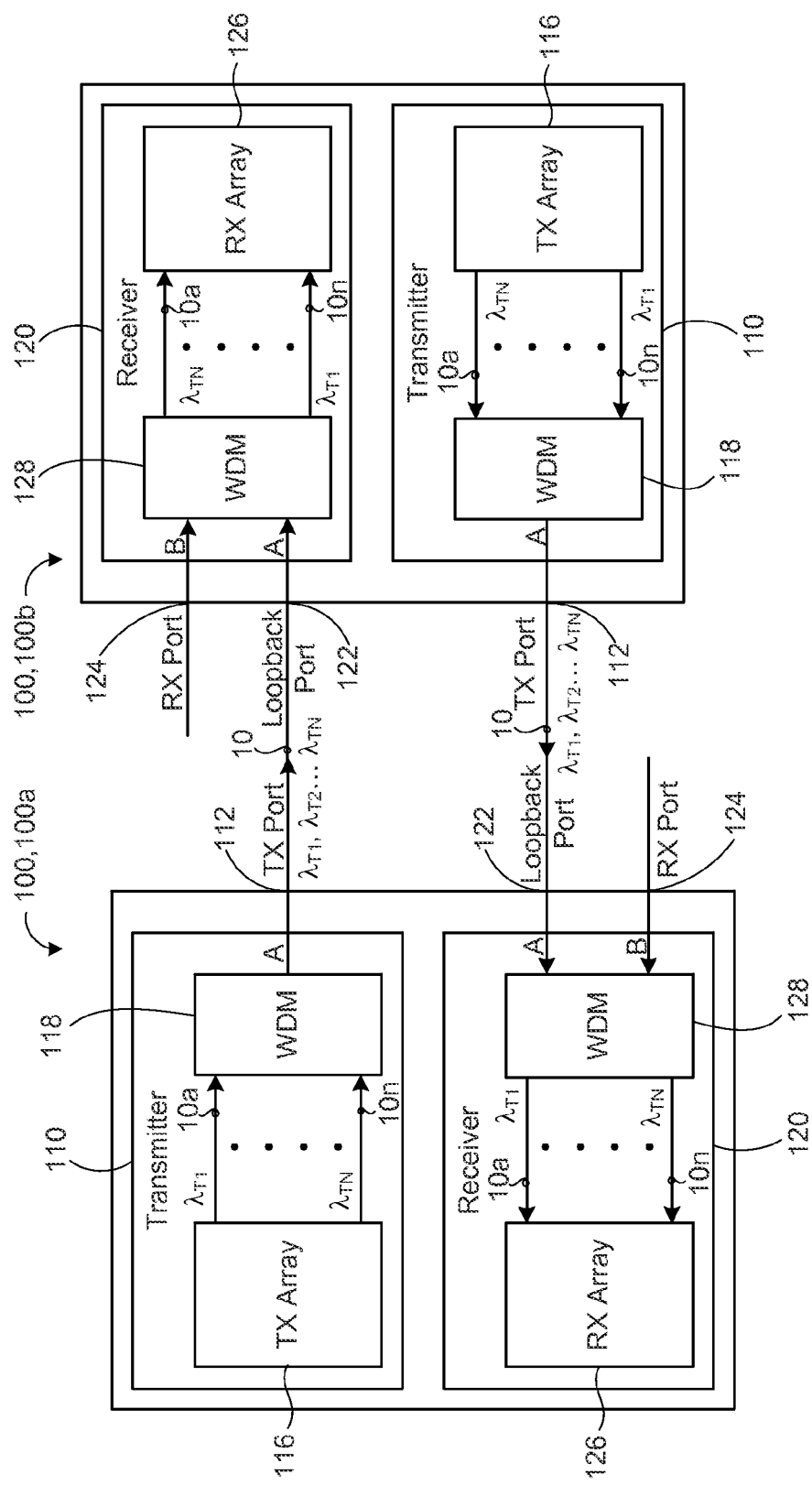
FIG. 7 is a schematic view of an exemplary optical communication device in a point-to-point communication network.

FIG. 7 illustrates an exemplary point-to-point connection established by optically connecting a first optical communication device 100a to a second optical communication device 100b. A point-to-point connection refers to a connection between two devices without including other elements or devices in the communication network. The first and second devices 100a, 100b each includes a transmitter 110 and a receiver 120. Each transmitter 110 has a transmitter port 112 transmitting a first multiplexed optical signal 10 in a first optical spectrum A, and a receiver 120 having a receiver port 124 and a loopback port 122. The loopback port 122 receiving the first multiplexed signal 10 outputted from the output port 112 of the other device 100a, 100b.

Each transmitter 110 may include a transmitter array 116 and a multiplexer 118. The transmitter array 116 includes multiple transmitters 116a-n that transmit light signals 10a-n at different wavelengths $\lambda_{T1-TN}$. The multiplexer 118 receives the light emitted from the transmitter array 116 at the different wavelengths $\lambda_{T1-TN}$ and multiplexes the signals 10a-n resulting in a first multiplexed signal 10 outputted from the transmitter port 112 of the transmitter 110. The first multiplexed signal 10 is in a first optical spectrum A. The receiver 120 receives the first multiplexed signal 10 via its loopback port 122 and converts it to an electrical signal (current/voltage). In some examples, the receiver 120 includes a receiver array 126 in optical communication with a demultiplexer 128. The receiver array 126 includes a plurality of receiver 126a-n for receiving different optical signals 10a-n, 20a-n at different wavelengths $\lambda_{R1-N}$. The multiplexer 128 receives the multiplexed signal 50 at a receiving port 124 and demultiplexes the multiplexed signal 50 into the multiple received signals $\lambda_{T1-TN}, \lambda_{R1-N}$.

Figure 8:
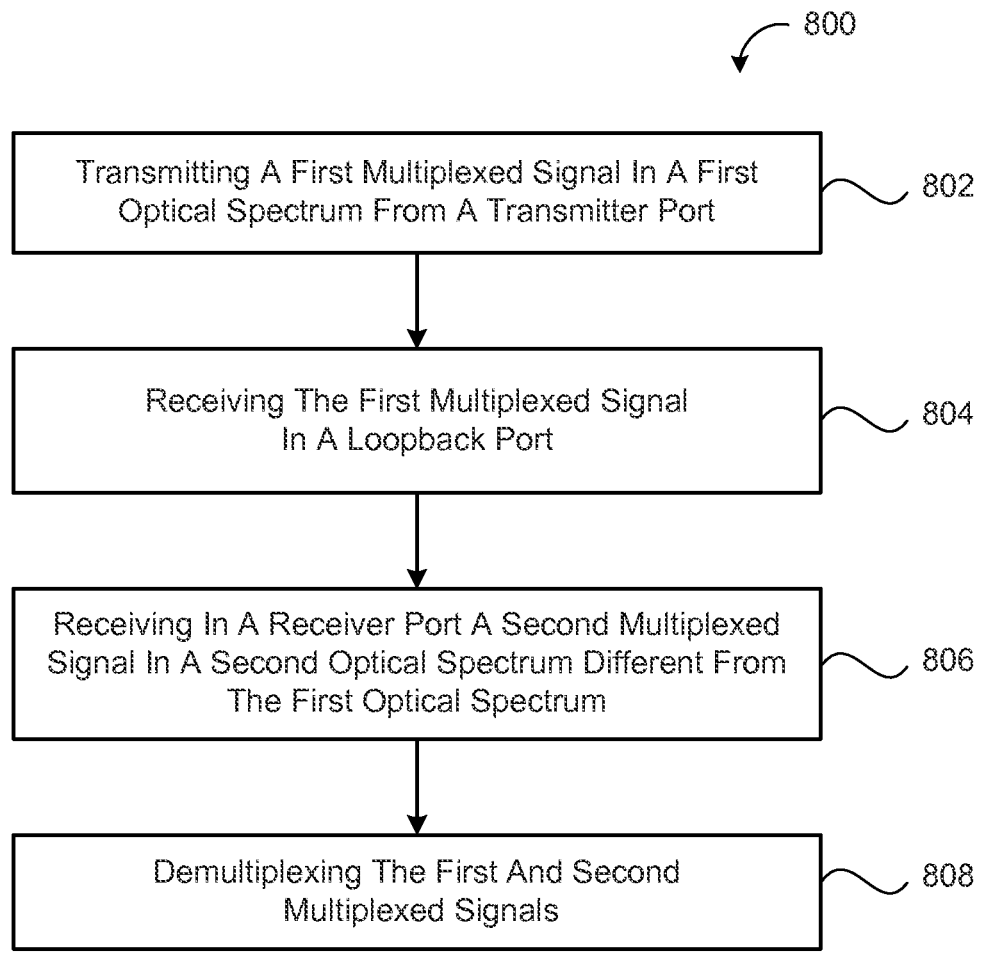
FIG. 8 is a schematic view of an exemplary arrangement of operations for a method of optical loopback in a WDM system.

FIG. 8 provides exemplary arrangement of operations for a method 800 of processing optical signals 10 in a wavelength division multiplexing passive optical network. The method 800 includes transmitting 802 a first multiplexed signal 10 in a first optical spectrum A from a transmitter port 112 of a transmitter 110, receiving 804 the first multiplexed signal 10 in a loopback port 122, and receiving 806 a second multiplexed signal 20 in a receiver port 124. The loopback port 122 and the receiving port 124 are ports on a receiver128. The second multiplexed signal 20 is in a second optical spectrum B different from the first optical spectrum A. In some examples, the receiver 120 includes a multiplexer 128 for demultiplexing a received signal 10, 20. The method 800 further includes demultiplexing 808 the first and second multiplexed signals 10, 20.

In some implementations, during the demultiplexing 808 of the first and second multiplexed signals 10, 20, for each multiplexed signal 10, 20, the method 800 includes separating the multiplexed signal 10, 20 into demultiplexed signals 10a-n, 20a-n having corresponding wavelengths $\lambda_{T1}$-$\lambda_{TN}$, $\lambda_{R1}$-$\lambda_{RN}$ and outputting the demultiplexed signals 10a-n, 20a-n to respective output ports 127a-n. The demultiplexed signals 10a-n, 20a-n of the first and second multiplexed signals 10, 20 may be mapped to respective output ports 127a-n. The receiver 120 may include a receiver array 126 having a plurality of receivers 126a-n. Additionally or alternatively, the method 800 may include routing the demultiplexed signals $\lambda_{T1}$-$\lambda_{TN}$, $\lambda_{R1}$-$\lambda_{RN}$ from the output ports 127a-n to an array of receivers 126.

In some implementations, the method 800 includes splitting the first multiplexed signal 10 into first and second split multiplexed signals 10b, 10c and routing the second split multiplexed signal 10b to the loopback port 122. The first multiplexed signal 10 may be split into more than two split signals as well. Splitting the first multiplexed signal 10 may include determining an optical power budget of the fiber optics network. The second split multiplexed signal 10b may have a threshold percentage of power P (e.g., between 1% and 20%).

In some examples, the method 800 includes combining the split signal 10b with a third multiplexed signal 30 into a fourth multiplexed signal 40 using a combiner 320. The fourth multiplexed signal 40 is received by the loopback port 122. In some examples, the method 800 includes controlling routing of the split signal 10b to the loopback port 122, using a controller 300, by allowing delivery of the first multiplexed signal 10, 10b to the loopback port 122 while failing to receive the second multiplexed signal 20 at the receiver port 124.

In some implementations, the method 800 further includes receiving substantially 100% of the first multiplexed signal 10 in the loopback port 122. The method 800 may include controlling, using a controller 300, receipt of the first multiplexed signal 10 in the loopback port 122 by allowing delivery of the first multiplexed signal 10 to the loopback port while failing to receive the second multiplexed signal 20 at the receiver port 124. Additionally, the method 800 may include combining the first multiplexed signal 10 (or the second split multiplexed signal 10b) with a third multiplexed 30 signal and outputting a combined signal 40 to the loopback port 122 of the receiver 120.

In some examples, the method 800 includes receiving signals 10a-n having corresponding wavelengths $\lambda_{T1}$-$\lambda_{TN}$, from a transmitter array 116 (e.g., at corresponding ports 117a-n of a multiplexer 118), multiplexing the received signals 10a-n, and outputting the first multiplexed signal 10 (e.g., at a transmitter port 112).

A number of implementations have been described. Nevertheless, it will be understood that various modifications may be made without departing from the spirit and scope of the disclosure. For example, some examples describe splitting a multiplexed signal into two split multiplexed signals; however, additional splitting may occur as well. Likewise, more than two signals can be combined into one signal. Accordingly, other implementations are within the scope of the following claims.

What is claimed is:

1. An optical communication device comprising:
    a transmitter having a transmitter port and transmitting a first multiplexed signal in a first optical spectrum from the transmitter port;
    a receiver having a loopback port and a receiver port, the receiver receiving the first multiplexed signal in the loopback port and a second multiplexed signal in the receiver port, the second multiplexed signal in a second optical spectrum different from the first optical spectrum, the receiver comprising a demultiplexer in optical communication with the loopback port and the receiver port, the demultiplexer demultiplexing the first and second multiplexed signals received by the loopback and receiver ports; and
    an optical coupler in optical communication with the transmitter port and the loopback port, the optical coupler routing a threshold percentage of power of the first multiplexed signal to the loopback port.

2. The optical communication device of claim 1, wherein the threshold percentage of power of the first multiplexed signal is between 1% and 20%.

3. The optical communication device of claim 1, further comprising an optical switch in optical communication with the optical coupler and the loopback port, the optical switch controlling routing of the first multiplexed signal to the loopback port.

4. The optical communication device of claim 3, further comprising a controller connected to and controlling the optical switch, the controller allowing the demultiplexer to receive the first multiplexed signal while the demultiplexer fails to receive the second multiplexed signal.

5. The optical communication device of claim 1, further comprising a combiner in optical communication with the optical coupler and the loopback port.

6. The optical communication device of claim 1, further comprising an optical switch in optical communication with the transmitter port and the loopback port, the optical switch routing the first multiplexed signal to the loopback port.

7. The optical communication device of claim 6, further comprising a controller connected to and controlling the optical switch, the controller allowing the demultiplexer to receive the first multiplexed signal while the demultiplexer fails to receive the second multiplexed signal.

8. An optical communication comprising:
    a transmitter having a transmitter port and transmitting a first multiplexed signal in a first optical spectrum from the transmitter port;
    a receiver having a loopback port and a receiver port, the receiver receiving the first multiplexed signal in the loopback port and a second multiplexed signal in the receiver port, the second multiplexed signal in a second optical spectrum different from the first optical spectrum, the receiver comprising a demultiplexer in optical communication with the loopback port and the receiver port, the demultiplexer demultiplexing the first and second multiplexed signals received by the loopback and receiver ports;
    an optical switch in optical communication with the transmitter port and the loopback port, the optical switch routing the first multiplexed signal to the loopback port;
    a combiner in optical communication with the optical switch and the loopback port and
    a controller connected to and controlling the optical switch, the controller allowing the demultiplexer to receive the first multiplexed signal while the demultiplexer fails to receive the second multiplexed signal.

9. The optical communication device of claim 1, wherein, for each multiplexed signal, the demultiplexer separates the multiplexed signal into demultiplexed signals and outputs the demultiplexed signals to respective mapped output ports.

10. An optical communication device comprising:
    a transmitter having a transmitter port and transmitting a first multiplexed signal in a first optical spectrum from the transmitter port; and
    a receiver having a loopback port and a receiver port, the receiver receiving the first multiplexed signal in the loopback port and a second multiplexed signal in the receiver port, the second multiplexed signal in a second optical spectrum different from the first optical spectrum, the receiver comprising a demultiplexer in optical communication with the loopback port and the receiver port, the demultiplexer demultiplexing the first and second multiplexed signals received by the loopback and receiver ports,
    wherein, for each multiplexed signal, the demultiplexer separates the multiplexed signal into demultiplexed signals and outputs the demultiplexed signals to respective mapped output ports, and
    wherein the demultiplexer comprises an arrayed waveguide grating having first and second input ports and N output ports, the first input port receiving the first multiplexed signal from the loopback port, and the second input port receiving the second multiplexed signal from the receiving port.

11. The optical communication device of claim 1, wherein the receiver comprises an array of receivers optically connected to the demultiplexer.

12. The optical communication device of claim 1, wherein the transmitter comprises:
    an array of transmitters; and
    a multiplexer in optical communication with the transmitters, the multiplexer receiving signals from the transmitters, multiplexing the received signals, and outputting the first multiplexed signal.

13. The optical communication device of claim 1, wherein the multiplexer comprises an arrayed waveguide grating.

14. A method of processing optical signals in a wavelength division multiplexing passive optical network, the method comprising:
    transmitting a first multiplexed signal in a first optical spectrum from a transmitter port;
    splitting the first multiplexed signal, the split first multiplexed signal having a threshold percentage of power;
    receiving the split first multiplexed signal in a loopback port;
    receiving a second multiplexed signal in a receiver port, the second multiplexed signal in a second optical spectrum different from the first optical spectrum; and
    demultiplexing the first and second multiplexed signals.

15. The method of claim 14, wherein demultiplexing the first and second multiplexed signals comprises, for each multiplexed signal, separating the multiplexed signal into demultiplexed signals and outputting the demultiplexed signals to respective output ports.

16. The method of claim 15, wherein the demultiplexed signals of the first and second multiplexed signals are mapped to respective output ports.

17. The method of claim 15, further comprising routing the demultiplexed signals from the output ports to an array of receivers.

18. The method of claim 14, wherein the threshold percentage of power of the first multiplexed signal is between 1% and 20%.

19. The method of claim 14, further comprising combining the split first multiplexed signal with a third multiplexed signal received by the loopback port.

20. The method of claim 14, further comprising controlling routing of the split first multiplexed signal to the loopback port by allowing delivery of the first multiplexed signal to the loopback port while the failing to receive the second multiplexed signal at the receiver port.

21. The method of claim 14, further comprising receiving substantially 100% of the first multiplexed signal in a loopback port.

22. The method of claim 21, further comprising controlling receipt of the first multiplexed signal in a loopback port by allowing delivery of the first multiplexed signal to the loopback port while the failing to receive the second multiplexed signal at the receiver port.

23. The method of claim 21, further comprising combining the first multiplexed signal with a third multiplexed signal received by the loopback port.

24. The method of claim 14, further comprising receiving signals from an array of transmitters, multiplexing the received signals, and outputting the first multiplexed signal.

\* \* \* \* \*